US012646002B2

(12) United States Patent
Xu et al.

(10) Patent No.: US 12,646,002 B2
(45) Date of Patent: Jun. 2, 2026

(54) OPTIMIZING DETECTION OF ABNORMAL DATA POINTS IN TIME SERIES DATA

(71) Applicant: International Business Machines Corporation, Armonk, NY (US)

(72) Inventors: Jing Xu, Xi'an (CN); Si Er Han, Xi'an (CN); Xue Ying Zhang, Xi'an (CN); Xiao Ming Ma, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 18/476,075

(22) Filed: Sep. 27, 2023

(65) Prior Publication Data

US 2025/0103948 A1      Mar. 27, 2025

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| 9,699,049 B2 | 7/2017 | Gupta | |
| 9,858,107 B2 * | 1/2018 | Arndt | .................... G06F 9/5038 |

| 9,965,727 B2 * | 5/2018 | Arndt | .................... G06F 9/5011 |
| 10,453,007 B2 | 10/2019 | Chu | |
| 10,904,276 B2 | 1/2021 | Phadke | |
| 11,423,227 B2 * | 8/2022 | Qi | ......................... G06F 40/295 |
| 11,556,514 B2 * | 1/2023 | Raphael | ................ G06F 16/221 |
| 11,640,387 B2 | 5/2023 | Gonzalez Macias | |
| 12,190,215 B1 * | 1/2025 | Gupta | .................... G06N 20/00 |
| 2015/0170055 A1 * | 6/2015 | Beymer | ................. G06N 20/00 |
| | | | 706/12 |
| 2018/0046926 A1 * | 2/2018 | Achin | ....................... G06N 5/02 |
| 2019/0286070 A1 * | 9/2019 | Luo | .................... G05B 23/0272 |
| 2021/0357431 A1 * | 11/2021 | Yang | ...................... G06Q 30/04 |

OTHER PUBLICATIONS

Baireddy et al. "Spacecraft Time-Series Anomaly Detection Using Transfer Learning" 2021 IEEE, pp. 1951-1960.*

(Continued)

*Primary Examiner* — Maikhanh Nguyen
(74) *Attorney, Agent, or Firm* — Michael O'Keefe

(57) ABSTRACT

In an approach for optimizing abnormal point detection, a processor receives a set of data, wherein the set of data is partially labeled time series data; determines a data block size for the set of data; splits the set of data into data blocks based on the data block size; computes trait measurements for traits for each data block; assigns a tag to each data block, wherein the tag is selected from the group consisting of a normal tag, an abnormality tag, and an unknown tag; uses the respective data blocks with either the normal tag or the abnormality tag as training data; updates the training data with artificial abnormalities; trains a detection model with the updated training data; and utilizes the trained detection model to predict whether the respective data blocks with the unknown tag have an abnormality or no abnormality.

20 Claims, 2 Drawing Sheets

(56) References Cited

OTHER PUBLICATIONS

Hsieh et al. "Unsupervised Online Anomaly Detection on Multivariate Sensing Time Series Data for Smart Manufacturing" 2019 IEEE, pp. 90-97.*

"Toshiba's Time-series Waveform Anomaly Detection AI Minimizes Missed Anomalies or False Alarms Offering High Explainability", Toshiba, Jun. 2, 2020, 4 pages, <https://www.global.toshiba/ww/technology/corporate/rdc/rd/topics/20/2006-02.html>.

"Using multiple predictions and standard statistical measures to reduce false positives during real-time, time series analysis of metrics which measure operating system behavior", An IP.com Prior Art Database Technical Disclosure, Disclosed Anonymously, IP.com No. IPCOM000195181D, IP.com Electronic Publication Date: Apr. 22, 2010, 3 pages, <https://priorart.ip.com/IPCOM/000195181>.

Aguinaga, Alaine Iturria, "Reduction of False Positives in Online Outlier Detection Over Time Series Using Ensemble Learning", Ikerlan, Apr. 14, 2023, 4 pages, <https://www.ikerlan.es/en/lines-of-research/thesis/item/reduction-of-false-positives-in-online-outlier-detection-over-time-series-using-ensemble-learning>.

Berkhahn, Felix, "Anomaly Detection with False Positive Suppression", The Technology of IOT Blog, Jan. 17, 2020, 12 pages, <https://relayr.io/technology-blog/anomaly-detection-with-false-positive-suppression/>.

Han et al., "Abnormal Point Simulation", IBM Application No. P202300447US01, U.S. Appl. No. 18/337,469, filed Jun. 20, 2023, 40 pages.

Harandi et al., "STAD-FEBTE, a Shallow and Supervised Framework for Time Series Anomaly Detection by Automatic Feature Engineering, Balancing, and Tree-Based Ensembles: An Industrial Case Study", 2023 IEEE/ASME International Conference on Advanced Intelligent Mechatronics (AIM), Jun. 28-30, 2023. Seattle, Washington, 7 pages, <https://vbn.aau.dk/en/publications/stad-febte-a-shallow-and-supervised-framework-for-time-series-ano>.

Schmidl et al., "Anomaly Detection in Time Series: A Comprehensive Evaluation", Proceedings of the 48th International Conference on Very Large Databases (VLDB) Endowment, Sydney, Australia, Sep. 5-9, 2022, vol. 15, No. 9, 19 pages, <https://www.vldb.org/pvldb/vol15/p1779-wenig.pdf>.

Xu et al., "Semi-supervised Variational Temporal Convolutional Network for IoT Communication Multi-anomaly Detection", Cornell University, arXiv, Apr. 5, 2021, 9 pages, <https://arxiv.org/abs/2104.01813>.

Do et al. "Data Augmentation for 12-Lead ECG Beat Classification", SN Computer Science, Nov. 19, 2021, 17 pages, vol. 3, article No. 7.

International Searching Authority, "Notification of Transmittal of the International Search Report and the Written Opinion of the International Searching Authority, or Declaration," Patent Cooperation Treaty, Nov. 22, 2024, 11 pages, International Application No. PCT/IB2024/057805.

Ma et al. "Segmentation of Time Series in Improving Dynamic Time Warping", IEEE, Dec. 2018, 6 pages.

Xiang et al. "Fast CRDNN: Towards on Site Training of Mobile Construction Machines", IEEE Access, 15 pages, vol. 4.

* cited by examiner

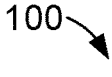

COMPUTER  101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

OPTIMIZED ABNORMAL POINT DETECTION PROGRAM 126

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

OPTIMIZING DETECTION OF ABNORMAL DATA POINTS IN TIME SERIES DATA

BACKGROUND OF THE INVENTION

The present invention relates generally to the field of data processing, and more particularly to a method and system for optimizing detection of abnormal data points in time series data.

Time series data, also referred to as time-stamped data, is a sequence of data points indexed in time order. These data points typically consist of successive measurements made from the same source over a fixed time interval and are used to track change over time. This time series data can be produced and collected from sensors or other machines, such as Internet of Things (IoT) sensors and devices.

SUMMARY

Aspects of an embodiment of the present invention disclose a method, computer program product, and computer system for optimizing detection of abnormal data points in time series data. One or more processors receive a set of data, wherein the set of data is partially labeled time series data. One or more processors determine a data block size for the set of data. One or more processors split the set of data into data blocks based on the data block size. One or more processors compute trait measurements for traits for each data block. One or more processors assign a tag to each data block, wherein the tag is selected from the group consisting of a normal tag, an abnormality tag, and an unknown tag. One or more processors use the respective data blocks with tags indicating an abnormality and no abnormality as training data. One or more processors update the training data with artificial abnormalities. One or more processors train a detection model with the updated training data. One or more processors utilize the trained detection model to predict whether the respective data blocks with the unknown tag have an abnormality or no abnormality.

In some embodiments of the present invention, one or more processors determine the data block size using spectral analysis methods to observe patterns and identify peaks on a power spectral density plot to identify cutoff points dictating the data block size.

In some embodiments of the present invention, one or more processors store the trait measurements for each data block as records in a table with each row representing one data block of the data blocks and each column representing one trait of the traits.

In some embodiments of the present invention, one or more processors add an additional column to the table with the assigned tag for each data block.

In some embodiments of the present invention, the tag is assigned based on whether data points within a respective data block included a label or no label, and wherein the respective label indicates an abnormality or no abnormality.

In some embodiments of the present invention, the abnormality tag indicates an abnormality in the respective data block, the normal tag indicates no abnormality in the respective data block, and the unknown tag indicates it is unknown whether there is an abnormality in the respective data block.

In some embodiments of the present invention, one or more processors update the training data with artificial abnormalities by updating one or more of the data blocks with the normal tag to the abnormality tag so the updated training data has a more equal number of data blocks with the normal tag and data blocks with the abnormality tag.

These and other features and advantages of the present invention will be described in, or will become apparent to those of ordinary skill in the art in view of, the following detailed description of the example embodiments of the present invention.

BRIEF DESCRIPTION OF THE DRAWINGS

FIG. 1 is a functional data block diagram illustrating a computing environment, for running an optimized abnormal point detection program, in accordance with an embodiment of the present invention.

DETAILED DESCRIPTION

Figure 2:
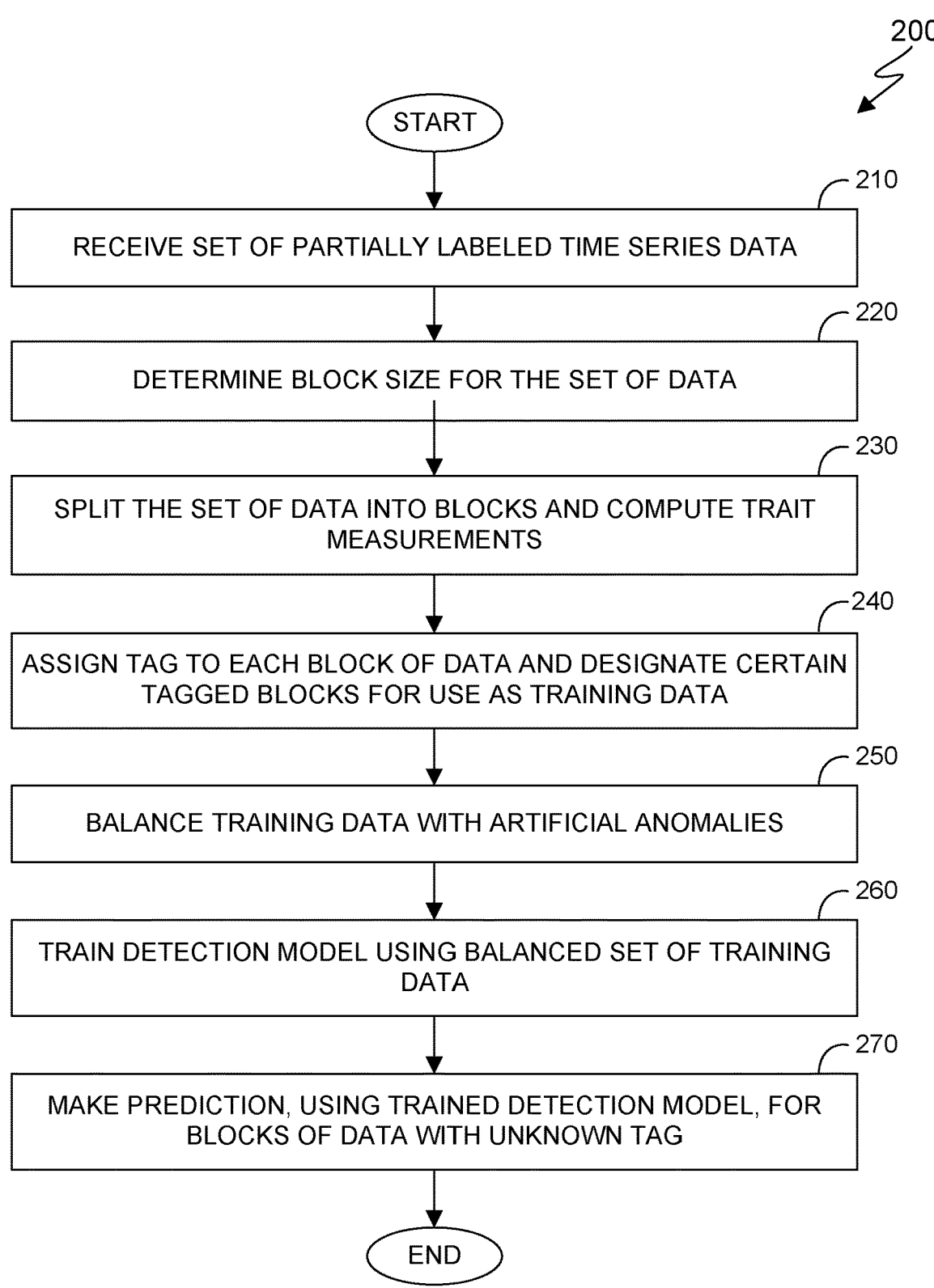
FIG. 2 is a flowchart depicting operational steps of the optimized abnormal point detection program, for optimizing detection of abnormal data points in time series data, running on a computer of the distributed data processing environment of FIG. 1, in accordance with an embodiment of the present invention.

Embodiments of the present invention recognize that for abnormal point detection, a model (e.g., a semi-supervised anomaly detection model) can be built and trained on time series data (e.g., sensor data) to identify a normal range or pattern for the data. Once trained, the model can predict future data points one by one, and thus, identify abnormal values that appear in the output time series data. As new time series data points are input into the model, the model predicts whether the data point is abnormal or not based on the previous data points. A problem with this conventional methodology is that the model can mistakenly predict normal points as abnormal points, i.e., "false positives", requiring manual review and labeling of whether the predictions of the model were correct, which is not time or cost effective resulting in only a small portion of data that can be labeled. Thus, embodiments of the present invention recognize the need for a way to decrease these false positive predictions enabling a more trustworthy prediction model.

Embodiments of the present invention provide a system and method for decreasing the prediction of false abnormal points for more trustworthy prediction of abnormal points in future time series data. Embodiments of the present invention provide this by splitting a set of partially labeled time series data (e.g., a data set that could only be manually partially labelled per conventional methods) into data blocks, transforming data block trait measures into a new record for each data block that forms a new data set for model training of abnormal point detection, balancing the new data set for training with synthetic anomalies, and implementing the trained model for abnormal point detection.

Implementations of the invention provide a technical solution to the technical problems associated with abnormal point detection in time series data of conventionally trained detection models predicting "false positives" of abnormal points. Implementations of the invention thus provide improvements in the field of detection models predicting abnormal points in time series data. The improvements are technical in nature because they are inextricably tied to computing and involve optimizing a set of data to be used as training data for a detection model by using spectral analysis methods to determine data block size and adding in artificial abnormalities to balance the training data.

Embodiments of the present invention optimize prediction of abnormal data points in time series data by a detection model. Accordingly, implementations of aspects of the present invention provide an improvement (i.e., technical solution) to a problem arising in the technical field of detection models. In particular, embodiments of the present invention use spectral analysis methods to determine a data block size and add artificial abnormalities to data blocks to provide a more balanced training data set for a detection model, and thus, embodiments of the present invention may not be performed in a human mind. Further, implementations of the present invention improve the functioning of the computer by minimizing computing resources needed for abnormal point detection while improving detection model accuracy.

Aspects of an embodiment of the present invention disclose a method, computer program product, and computer system for optimizing detection of abnormal data points in time series data. One or more processors receive a set of data, wherein the set of data is partially labeled time series data. One or more processors determine a data block size for the set of data. One or more processors split the set of data into data blocks based on the data block size. One or more processors compute trait measurements for traits for each data block. One or more processors assign a tag to each data block, wherein the tag is selected from the group consisting of a normal tag, an abnormality tag, and an unknown tag. One or more processors use the respective data blocks with tags indicating an abnormality and no abnormality as training data. One or more processors update the training data with artificial abnormalities. One or more processors train a detection model with the updated training data. One or more processors utilize the trained detection model to predict whether the respective data blocks with the unknown tag have an abnormality or no abnormality. This has the technical effect of reducing the incorrect prediction of an abnormal point in time series data, i.e., false positives, leading to accuracy improvements and less need for manual review of model outputs.

In some embodiments of the present invention, one or more processors determine the data block size using spectral analysis methods to observe patterns and identify peaks on a power spectral density plot to identify cutoff points dictating the data block size.

In some embodiments of the present invention, one or more processors store the trait measurements for each data block as records in a table with each row representing one data block of the data blocks and each column representing one trait of the traits.

In some embodiments of the present invention, one or more processors add an additional column to the table with the assigned tag for each data block.

In some embodiments of the present invention, the tag is assigned based on whether data points within a respective data block included a label or no label, and wherein the respective label indicates an abnormality or no abnormality.

In some embodiments of the present invention, the abnormality tag indicates an abnormality in the respective data block, the normal tag indicates no abnormality in the respective data block, and the unknown tag indicates it is unknown whether there is an abnormality in the respective data block.

In some embodiments of the present invention, one or more processors update the training data with artificial abnormalities by updating one or more of the data blocks with the normal tag to the abnormality tag so the updated training data has a more equal number of data blocks with the normal tag and data blocks with the abnormality tag. This has the technical effect of improving the quality of the training data in training a detection model for better predicting abnormal points in time series data.

Implementation of embodiments of the present invention may take a variety of forms, and exemplary implementation details are discussed subsequently with reference to the Figures.

Various aspects of the present disclosure are described by narrative text, flowcharts, data block diagrams of computer systems and/or data block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart data blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 1, computing environment 100 contains an example of an environment for the execution of at least some of the computer code involved in performing the inventive methods, such as optimized abnormal point detection program 126. In addition to data block 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data block 126, as identified above), peripheral device set 114 (including user interface (UI) device set 123, storage 124, and Internet of Things (IoT) sensor set 125), and network module 115.

Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processors set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data block 116 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in data block 116 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Optimized abnormal point detection program 126 operates to optimize an abnormal point detection model by decreasing the occurrence of false positive predictions by the model of abnormal points in time series data. In the depicted embodiment, optimized abnormal point detection program 126 is a standalone program. In another embodiment, optimized abnormal point detection program 126 may be integrated into another software product, e.g., a machine learning product or package. In an embodiment, optimized abnormal point detection program 126 The detailed steps of optimized abnormal point detection program 126 are depicted and described in further detail with respect to FIG. 2.

FIG. 2 is a flowchart, generally designated 200, illustrating the operational steps for optimized abnormal point detection program 126, running on computer 101 of computing environment 100 of FIG. 1, in accordance with an embodiment of the present invention. In an embodiment, optimized abnormal point detection program 126 operates to optimize detection of abnormal data points in time series data. It should be appreciated that the process depicted in FIG. 2 illustrates one possible iteration of the process flow.

In step 210, optimized abnormal point detection program 126 receives a set of partially labeled time series data. In an embodiment, optimized abnormal point detection program 126 receives a set of partially labeled time series data, in which on a small portion of the data points have been manually labeled by a user to be normal or abnormal. The set of partially labeled time series data can be univariate time series data (i.e., single observation over a time period of a variable, e.g., a sensor measuring the temperature every second) or multivariate time series data (i.e., more than one observation collected over time of multiple variables, e.g., a tri-axial accelerometer measuring three accelerations over time). In an embodiment, optimized abnormal point detection program 126 receives the data from a database storing output of an abnormal point detection algorithm, in which the algorithm can be inaccurate producing many false positives of abnormal data points, and in which the output was manually partially labelled. Thus, embodiments of the present invention optimize this set of data by reducing the number of false positives of abnormality or anomaly detection in the data.

In step 220, optimized abnormal point detection program 126 determines a data block size for the set of data. In an embodiment, optimized abnormal point detection program 126 determines a data block size (i.e., segment length, e.g., 5 seconds) of the set of partially labeled time series data. In some embodiments, optimized abnormal point detection program 126 determines the data block size of the set of data using spectral analysis methods (e.g., a Spectral Analysis Model) to calculate the power spectral density or autocorrelation function. Based on observing patterns in the power spectral density or autocorrelation function, such as through identifying major peaks on a power spectral density plot or graph, optimized abnormal point detection program 126 identifies cutoff points for frequencies or delays in the set of data, which determine a segment length for the data, and thus, dictate a data block size. In other embodiments, optimized abnormal point detection program 126 determines the data block size of the set of data based on a pre-defined size set by a user.

In step 230, optimized abnormal point detection program 126 splits the set of data into data blocks and computes trait measurements. In an embodiment, optimized abnormal point detection program 126 splits the set of data into data blocks based on the determined data block size. In an embodiment, optimized abnormal point detection program 126 splits the set of data into a data block sequence including data blocks $B_1$, $B_2$ . . . $B_n$, in which each data block comprises a sequence of data points in time order. In an embodiment, once the set of data is split into data blocks, optimized abnormal point detection program 126 analyzes traits of each data block (i.e., traits of the data within a specific data block) based on values of data points within each data block to compute a measurement (i.e., value) for each trait within each data block. Traits of a data block may include, but are not limited to, mean, variance, autocorrelation function, partial correlation function, skew, and trend. In an embodiment, optimized abnormal point detection program 126 stores the trait values for each data block as records in a table with each row representing a data block and each column representing a trait.

In step 240, optimized abnormal point detection program 126 adds a tag to each data block of data. In an embodiment, optimized abnormal point detection program 126 adds a tag value to each data block of data based on the labels or lack of a label of the data points within the data block. The tag value signifies whether the data block of data includes an anomaly or not, potentially what type of anomaly is present, or if it is unknown whether an anomaly is present or not because none of the data points within the data block were labeled. In an example embodiment, tag values are selected from the group consisting of N for normal (i.e., no anomaly or abnormality), E for an extreme outlier anomaly, V for a variance change anomaly, L for a level shift anomaly, and NA for data points with no label (i.e., unknown). In an embodiment, optimized abnormal point detection program 126 adds a column to the table of records that will represent the tag value assigned to each data block. In an embodiment, optimized abnormal point detection program 126 uses the data blocks with tag values of N, E, V, and L as training data for a detection model in a later step of the process. In an embodiment, optimized abnormal point detection program 126 will use the trained detection model to predict whether there is an anomaly in the data blocks with tag NA.

In step 250, optimized abnormal point detection program 126 balances the training data with artificial anomalies. In an embodiment, optimized abnormal point detection program 126 balances the training data, which includes the data blocks with a tag value of N, E, V, and L, by adding artificial anomalies to one or more of the normal data blocks (i.e., data blocks with the tag N). This is necessary because usually a majority of the data blocks are normal with only minimal data blocks containing an anomaly, and therefore, the training data is highly imbalanced at this point. In an embodiment, optimized abnormal point detection program 126 updates a certain number of the data blocks with tag values of N to have tag values of E, V, or L to create an updated set of balanced training data, e.g., updates certain number of N data blocks to reach a threshold number of the training data that includes anomaly tags (i.e., E, V, or L), wherein the threshold is a parameter of the model training that can be preset and adjusted. In some embodiments, optimized abnormal point detection program 126 updates enough data blocks with tag values of N to a tag value of E, V, or L so that there is a similar number (i.e., more equal number) of tag values of N, E, V, and L.

In step 260, optimized abnormal point detection program 126 trains a detection model using the updated set of training data. In an embodiment, optimized abnormal point detection program 126 trains a detection model, e.g., extreme gradient boosting (XGBoost), neural network (NN), C5 decision tree classifier, Chi-squared automatic interaction detection (CHAID), etc., using the updated set of balanced training data. In an embodiment, by training with the updated set of balanced training data, optimized abnormal point detection program 126 creates a semi-supervised trained detection model for more accurately identifying anomalies and abnormalities in time series data leading to a reduced number of false positives.

In step 270, optimized abnormal point detection program 126 makes a prediction, using the trained detection model, for the data blocks with tag value of NA. In an embodiment, optimized abnormal point detection program 126 inputs each respective data block with tag value of NA into the trained detection model and receives the prediction output by the model for each data block as to whether an anomaly exists or not in the data block. These predictions can be compared to what a conventional detection algorithm predicted or would have predicted for the same data points to identify the false positives.

Therefore, embodiments of the present invention provide an optimized abnormal point detection program that produces balanced training data from an initial set of partially labeled time series data split into data blocks of data, tagged as either normal, abnormal, or unknown, and balanced with artificial anomalies; trains a detection model using the balanced training data; and implements the trained detection model to make predictions on the data blocks of data tagged as unknown, thus, improving the accuracy of abnormal point detection.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

receiving, by one or more processors, a set of data, wherein the set of data is partially labeled time series data;

determining, by the one or more processors, a data block size for the set of data;

splitting, by the one or more processors, the set of data into data blocks based on the data block size;

computing, by the one or more processors, trait measurements for traits for each data block;

assigning, by the one or more processors, a tag to each data block, wherein the tag is selected from the group consisting of a normal tag, an abnormality tag, and an unknown tag;

using, by the one or more processors, the respective data blocks with either the normal tag or the abnormality tag as training data;

updating, by the one or more processors, the training data with artificial abnormalities;

training, by the one or more processors, a detection model with the updated training data; and utilizing, by the one or more processors, the trained detection model to predict whether the respective data blocks with the unknown tag have an abnormality or no abnormality.

2. The computer-implemented method of claim 1, wherein determining the data block size is done using spectral analysis methods to observe patterns and identify peaks on a power spectral density plot to identify cutoff points dictating the data block size.

3. The computer-implemented method of claim 1, further comprising:

storing, by the one or more processors, the trait measurements for each data block as records in a table with each row representing one data block of the data blocks and each column representing one trait of the traits.

4. The computer-implemented method of claim 3, further comprising:

adding, by the one or more processors, an additional column to the table with the assigned tag for each data block.

5. The computer-implemented method of claim 1, wherein the tag is assigned based on whether data points within a respective data block included a label or no label, and wherein the respective label indicates an abnormality or no abnormality.

6. The computer-implemented method of claim 1, wherein the abnormality tag indicates an abnormality in the respective data block, the normal tag indicates no abnormality in the respective data block, and the unknown tag indicates it is unknown whether there is an abnormality in the respective data block.

7. The computer-implemented method of claim 1, wherein updating the training data with artificial abnormalities comprises:

updating, by the one or more processors, one or more of the data blocks with the normal tag to the abnormality tag so the updated training data has a more equal number of respective data blocks with the normal tag and respective data blocks with the abnormality tag.

8. A computer program product comprising:

one or more computer readable storage media and program instructions stored on the one or more computer readable storage media, the program instructions comprising:

program instructions to receive a set of data, wherein the set of data is partially labeled time series data;

program instructions to determine a data block size for the set of data;

program instructions to split the set of data into data blocks based on the data block size;

program instructions to compute trait measurements for traits for each data block;

program instructions to assign a tag to each data block, wherein the tag is selected from the group consisting of a normal tag, an abnormality tag, and an unknown tag;

program instructions to use the respective data blocks with either the normal tag or the abnormality tag as training data;

program instructions to update the training data with artificial abnormalities;

program instructions to train a detection model with the updated training data; and program instructions to utilize the trained detection model to predict whether the respective data blocks with the unknown tag have an abnormality or no abnormality.

9. The computer program product of claim 8, wherein the program instructions to determine the data block size is done using spectral analysis methods to observe patterns and identify peaks on a power spectral density plot to identify cutoff points dictating the data block size.

10. The computer program product of claim 8, further comprising:

program instructions to store the trait measurements for each data block as records in a table with each row representing one data block of the data blocks and each column representing one trait of the traits.

11. The computer program product of claim 10, further comprising:

program instructions to add an additional column to the table with the assigned tag for each data block.

12. The computer program product of claim 8, wherein the tag is assigned based on whether data points within a respective data block included a label or no label, and wherein the respective label indicates an abnormality or no abnormality.

13. The computer program product of claim 8, wherein the abnormality tag indicates an abnormality in the respective data block, the normal tag indicates no abnormality in the respective data block, and the unknown tag indicates it is unknown whether there is an abnormality in the respective data block.

14. The computer program product of claim 8, wherein the program instructions to update the training data with artificial abnormalities comprise:

program instructions to update one or more of the data blocks with the normal tag to the abnormality tag so the updated training data has a more equal number of respective data blocks with the normal tag and respective data blocks with the abnormality tag.

15. A computer system comprising:

one or more computer processors;

one or more computer readable storage media;

program instructions collectively stored on the one or more computer readable storage media for execution by at least one of the one or more computer processors, the stored program instructions comprising:

program instructions to receive a set of data, wherein the set of data is partially labeled time series data;

program instructions to determine a data block size for the set of data;

program instructions to split the set of data into data blocks based on the data block size;

program instructions to compute trait measurements for traits for each data block;

program instructions to assign a tag to each data block, wherein the tag is selected from the group consisting of a normal tag, an abnormality tag, and an unknown tag;

program instructions to use the respective data blocks with either the normal tag or the abnormality tag as training data;

program instructions to update the training data with artificial abnormalities;

program instructions to train a detection model with the updated training data; and program instructions to utilize the trained detection model to predict whether the respective data blocks with the unknown tag have an abnormality or no abnormality.

16. The computer system of claim 15, wherein the program instructions to determine the data block size is done using spectral analysis methods to observe patterns and identify peaks on a power spectral density plot to identify cutoff points dictating the data block size.

17. The computer system of claim 15, further comprising:

program instructions to store the trait measurements for each data block as records in a table with each row representing one data block of the data blocks and each column representing one trait of the traits.

18. The computer system of claim 17, further comprising:

program instructions to add an additional column to the table with the assigned tag for each data block.

19. The computer system of claim 15, wherein the tag is assigned based on whether data points within a respective data block included a label or no label, and wherein the respective label indicates an abnormality or no abnormality.

20. The computer system of claim 15, wherein the abnormality tag indicates an abnormality in the respective data block, the normal tag indicates no abnormality in the respective data block, and the unknown tag indicates it is unknown whether there is an abnormality in the respective data block.

\* \* \* \* \*